United States Patent
Ui et al.

(10) Patent No.: US 6,340,984 B1
(45) Date of Patent: Jan. 22, 2002

(54) IMAGE FORMING APPARATUS FOR CORRECTING AN ANGLE OF INCLINATION OF THE RECORDING MATERIAL AND FOR RECORDING CORRECTED IMAGE

(75) Inventors: Makoto Ui; Fumio Haibara, both of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/536,050

(22) Filed: Mar. 27, 2000

(30) Foreign Application Priority Data

Mar. 30, 1999 (JP) .................................. 11-088572

(51) Int. Cl.⁷ ........................... G03G 15/00; H04N 1/00
(52) U.S. Cl. ..................... 347/139; 358/1.18; 399/394
(58) Field of Search ........................... 399/394, 395; 347/139, 248; 358/1.18, 448, 401

(56) References Cited

U.S. PATENT DOCUMENTS 5,140,340 A * 8/1992 Stephenson ................ 347/177
5,321,437 A * 6/1994 Heeren ...................... 347/139

FOREIGN PATENT DOCUMENTS

| JP | 5-330206 | * 12/1993 |
| JP | 10-285379 | 10/1998 |
| JP | 10-336425 | 12/1998 |

* cited by examiner

Primary Examiner—Joan Pendegrass
(74) Attorney, Agent, or Firm—Frishauf, Holtz, Goodman, Langer & Chick, P.C.

(57) ABSTRACT

An image forming apparatus has: an image memory for storing image data; an image recording device having an image recording position for recording an image onto a recording material at the image recording position; a conveying device for conveying the recording material to the image recording position; and an image correction device for correcting an angle of the image data in accordance with inclination of the recording material conveyed to the image recording position. An image is recorded on the recording material by the image recording device on the basis of the image data corrected by the image correction device.

7 Claims, 6 Drawing Sheets

IMAGE FORMING APPARATUS FOR CORRECTING AN ANGLE OF INCLINATION OF THE RECORDING MATERIAL AND FOR RECORDING CORRECTED IMAGE

BACKGROUND OF THE INVENTION

The present invention relates to an image forming apparatus, and in particular, to a technology to correct image inclination in an image forming apparatus.

In an image forming apparatus used widely today including an image forming apparatus of an electrophotographic system, when conducting image forming on a large amount of sheets, recording sheets are conveyed successively to an image forming position one by one for image forming.

In case of a conventional image forming apparatus, there is investigated a technology to convey a recording sheet without causing skewing for the purpose of forming on a recording sheet an image which is neither inclined nor deviated positionally. For that purpose, there is employed a recording sheet conveyance method wherein, when a recording sheet is conveyed to an image recording position, the recording sheet is stopped momentarily this side of the image forming position so that a loop of the recording sheet may be formed, and then, the recording sheet is conveyed to the image forming position.

The recording sheet conveyance method stated above is effectual on the whole and it is employed widely for an electronic copying machine or the like. However, in the method mentioned above, it is difficult to eliminate skewing and shift thoroughly for conveyance of recording sheets of various types, and skewing and shift are sometimes caused depending upon a thickness or a size of a recording sheet. Further, even in the case of conveyance at high speed, skewing and shift are sometimes caused, which has caused problems that design and assembly of a conveyance section for a recording sheet require a highly advanced technology, an increase of copying speed or printing speed is impeded, and recording sheets to be used are limited.

SUMMARY OF THE INVENTION

The invention solves the problems in conveyance of recording sheets in conventional technologies, and its object is to provide an image forming apparatus capable of forming an uninclined image on a recording sheet.

The object of the invention stated above can be attained by an image forming apparatus having therein an inclination degree detecting means which detects inclination of a recording sheet conveyed to an image recording position where an image is formed on the recording sheet, and an image angle correcting means which changes an angle of an image to be formed based on information coming from the inclination degree detecting means.

DETAILED DESCRIPTION OF THE PREFERRED EMBODIMENT

Figure 1:
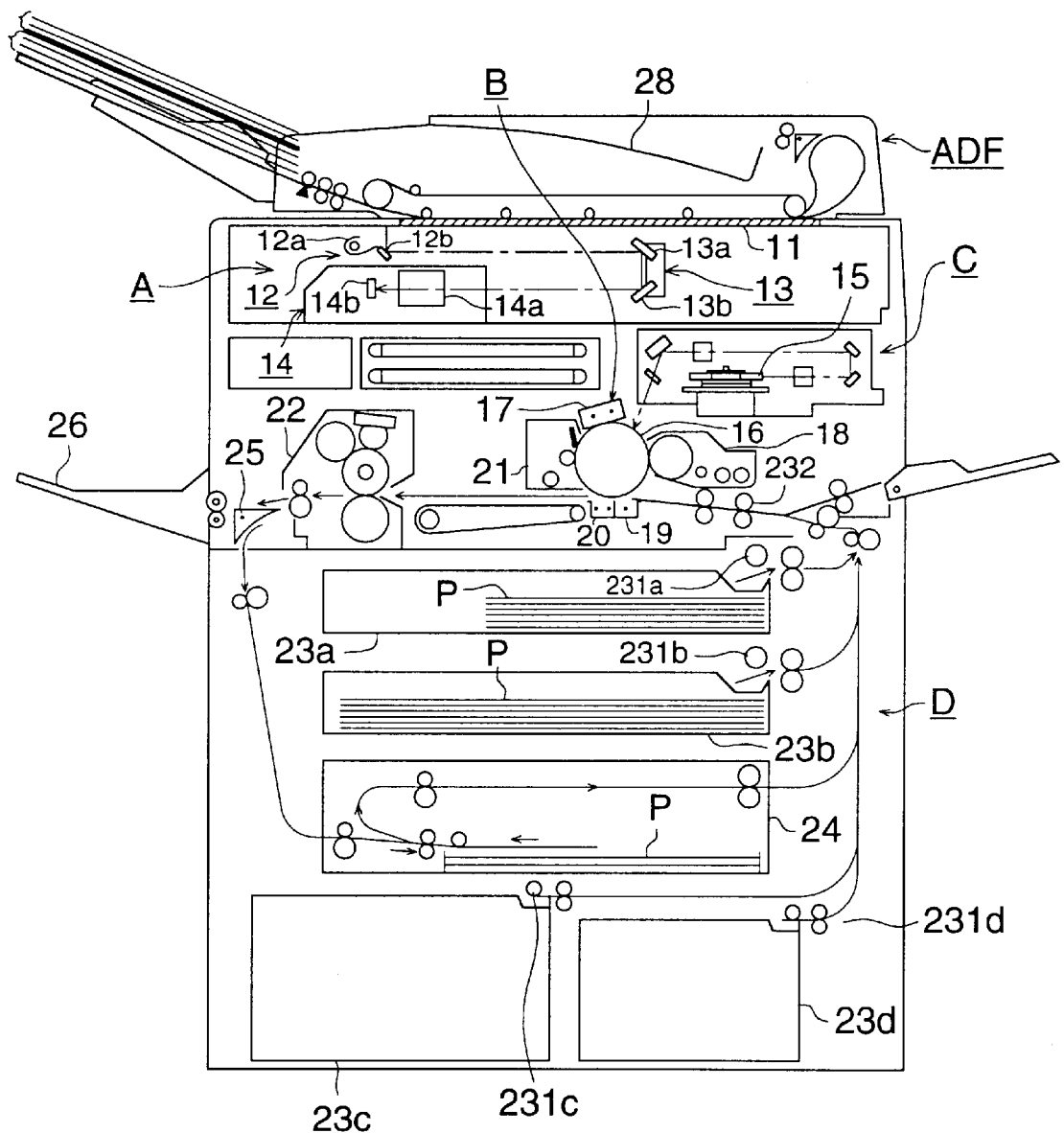
FIG. 1 is a diagram showing the structure of an image forming apparatus related to an embodiment of the invention.

An embodiment of the invention will be explained as follows, referring to the drawings. FIG. 1 is a diagram showing the structure of an image forming apparatus related to an embodiment of the invention.

An image forming apparatus has therein image reading means A, automatic document feeder ADF which feeds a sheet of document from a set of documents placed on a document placing platen and conveys it to a reading position of the image reading means A, image forming section B which conducts image forming on a recording sheet through an electrophotographic system, image writing section C, and sheet feeding section D, and an image recording section is composed of the image forming section B and the image writing section C.

In the image reading means A, a document conveyed by the automatic document feeder ADF which will be explained later is placed on platen glass 11 and is illuminated by halogen light source 12a provided on carriage 12 which travels on a guide rail (not shown). Movable mirror unit 13 on which a pair of mirrors 13a and 13b are provided travels on a slide rail to guide reflected light from the document placed on the platen glass 11, namely, an optical image to lens reading unit 14 through combination with mirror 12b provided on the carriage 12. The lens reading unit 14 is composed of image forming lens 14a and CCD line sensor 14b representing an image pickup means. The optical image corresponding to document image reflected on the mirrors 12b, 13a 13b is converged by the image forming lens 14a to be formed on a light receiving surface of the CCD line sensor 14b, thus an optical image on the line is successively converted photoelectrically into electric signals by the CCD line sensor 14b.

When a user presses a copy button (not shown), image information of a document equivalent to one page is read by CCD line sensor 14b through a movement of carriage 12 which is driven by a motor (not shown) and is equipped with halogen light source 12a and with mirror 12b and of movable mirror unit 13.

Image signals, namely, image data of document images read by the image reading means A are subjected to density conversion, filter processing, magnification change processing and γ correction in an image processing section (not shown), and then are outputted to image writing section C. Then, the image writing section C conducts latent image forming on photoreceptor 16 in image forming section B which conducts image forming through an electrophotographic system, in accordance with inputted image data. Namely, in the image writing section C, a laser beam emitted from a semiconductor laser (not shown) is modulated based on image signals. This laser beam is made to scan by polygon mirror 15 rotated by a driving motor (having no symbol), then, passes through fθ lens (having no symbol), and its optical path is polarized by reflection mirror (having no symbol), and is projected on the surface of drum-shaped photoreceptor 16 to form an electrostatic latent image on the photoreceptor 16 which is evenly charged. Exposure on the photoreceptor 16 by means of a laser beam is scanning exposure conducted by scanning in the main scanning direction which is made by polygon mirror 15 and by scanning in the sub-scanning direction which is made by rotation in the clockwise direction shown by an arrow mark of the photoreceptor 16.

On the other hand, in the image forming section B, there are provided photoreceptor 16, charging unit 17 for charging the photoreceptor 16 evenly, developing unit 18 representing a developing means, transfer electrode 19 representing a transfer means, separation electrode 20, cleaning unit 21, and fixing unit 22. The photoreceptor 16 which rotates clockwise in the drawing is charged evenly by the charging unit 17, and an electrostatic latent image is formed by the image writing section C on the photoreceptor 16. The charging unit 17 and the writing section C constitute a latent image forming means. The electrostatic latent image formed on the photoreceptor 16 is developed by the developing unit 18 to become a toner image which is further transferred by the transfer electrode 19 onto recording sheet P which is conveyed separately. The recording sheet P on which the toner image has been transferred is separated by the separation electrode 20, and the toner image is fixed by the fixing unit 22 on the recording sheet P. The photoreceptor 16 from which the toner image has been transferred onto recording sheet P continues rotating and is cleaned by the cleaning unit 21 to be ready for succeeding toner image forming.

The sheet feeding section D is composed of sheet feeding cassettes 23a–23d each being loaded with recording sheets P of each size or each direction, double-sided copying units (hereinafter referred to as ADU) 24 which reverses recording sheet P inside out when double-sided copying is carried out, sheet feeding rollers 231a–231d each feeding out recording sheet P from each of sheet feeding cassettes 23a–23d, a conveyance roller (having no symbol), and a conveyance belt (having no symbol). In accordance with instruction of a size or direction of a recording sheet, the relevant cassette is selected from the sheet feeding cassettes 23a–23d, and the relevant sheet feeding roller in the sheet feeding rollers 231a–231d operates to feed out recording sheet P and thereby to supply to registration roller 232. The registration roller 232 is a synchronization conveyance means which operates in synchronization with image forming on the photoreceptor 16 and conveys a recording sheet toward a transfer position formed by the transfer electrode 19, namely toward an image recording position where an image is formed on a recording sheet.

In the case of single-sided copying, a toner image is successively transferred and fixed on one side of recording sheet P taken out from each of sheet feeding cassettes 23a–23d, and the recording sheet P is ejected out on recording sheet ejection tray 26. On the other hand, in the case of double-sided copying, recording sheet P which has been subjected to transferring and fixing of a toner image on its one side and has been fed out is reversed downward by switching claw 25 arranged immediately behind fixing unit 22 in the recording sheet conveyance path, and is guided to ADU 24. In ADU 24, a direction of conveyance for the conveyed recording sheet P is changed, and by reversing it further, the recording sheet P is reversed inside out, and is fed to photoreceptor 16 in the same way as in sheet feeding from sheet feeding cassettes 23a–23d. Then, the toner image formed based on image data on the reverse side of the document is transferred and fixed, thus, a double-sided copy is obtained.

Further, in a digital copying machine in the present embodiment, automatic document feeder ADF which automatically conveys a document to platen glass 11 is provided on the upper portion of image reading means A. When making copies by the use of the automatic document feeder ADF, if a copy button is pressed after setting plural sheets of documents (hereinafter referred to as a set of documents) on document placing stand 27 in a way that an image surface of a document faces downward, the lowermost document in the set of documents is fed successively one by one, and is conveyed automatically to the prescribed position on platen glass 11 in succession, while image signals of the document are read as stated above, thus, the document which has been read is removed from the platen glass 11 and is ejected on document ejection tray 28.

Figure 2:
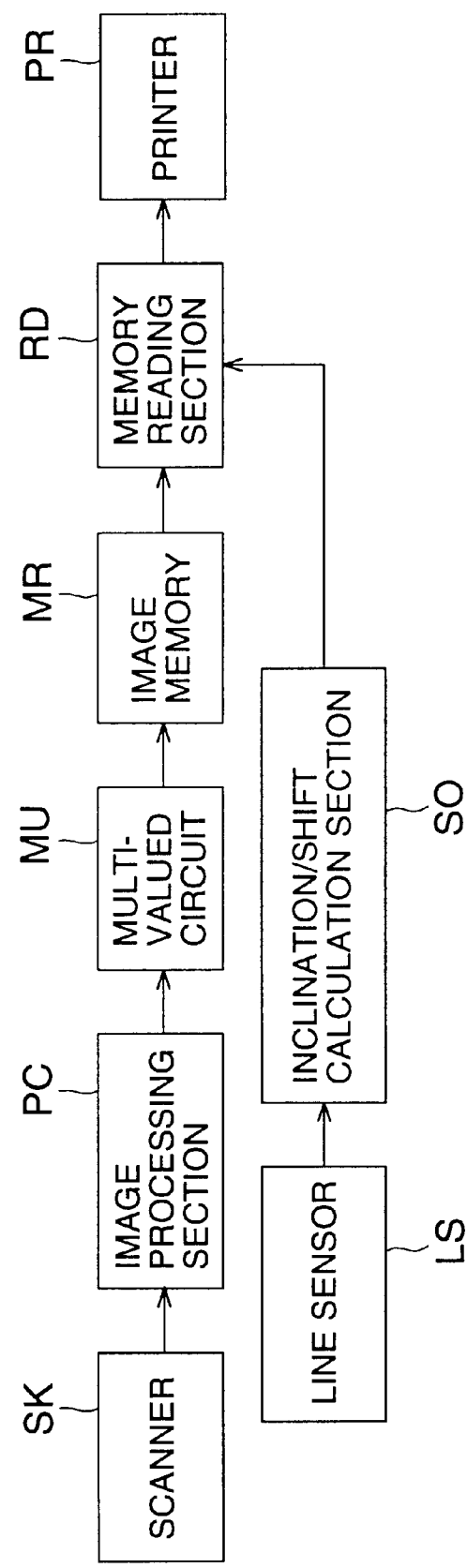
FIG. 2 is a block diagram of an image data processing system in the image forming apparatus shown in FIG. 1.

FIG. 2 is a block diagram of an image data processing system in the image forming apparatus shown in FIG. 1. Image data from scanner SK composed of CCD line sensor 14b, A/D converter, a shading correction circuit and a brightness/density conversion circuit are processed by image processing section PC which conducts filter processing, gradation conversion and magnification change processing, and are stored in image memory MR after being multi-valued by multi-valued circuit MU which compresses the bit number of a pixel, like a binary image. Image data read by image reading section RD from image memory MR drive a semiconductor laser of printer PR to expose photoreceptor 16 shown in FIG. 1 and thereby to form electrostatic latent images.

Line sensor LS is composed of CCD, and it detects a leading edge of recording sheet P conveyed toward a transfer position which is an image forming position. Inclination/shift calculation section SO calculates an inclination angle and an amount of a shift of recording sheet P based on leading edge detection information coming from the line sensor LS, and outputs information of an inclination angle and an amount of a shift. The line sensor LS representing a recording sheet sensor and the calculation section SO constitute an inclination detection means. Control section CR controls reading section RD based on output coming from the calculation section SO, and the control section CR and reading section RD constitute an image angle correction means. In this control, scanning exposure for forming images on photoreceptor 16 in accordance with an inclination angle and an amount of shift of recording sheet P conveyed to the transfer position is controlled so that images which are not inclined to and shifted from a transfer sheet may be formed on photoreceptor 16.

For processing image data which reflect an inclination angle and an amount of shift of recording sheet P, it is possible to use a known image data processing method. Namely, for processing of image data reflecting an inclination angle, it is possible to conduct, for example, affine transformation processing which employs a trigonometric function, for each pixel, or it is possible to use shift processing disclosed in Japanese TOKKAIHEI Nos. 10-285379 and 10-336425 for processing image data reflecting an inclination angle. It is also possible to use the shift processing for processing image data reflecting an amount of shift. When conducting data processing by means of affine transformation, image data are read from an image memory to be processed, then, they are recorded in a buffer memory (not shown) provided on printer section PR, and output of images is controlled based on that data. When the shift processing is used for processing data, it is conducted when reading image data from image memory MR, or when recording image data read from the image memory MR on a buffer memory provided on printer section PR, and then, output of images is controlled based on that data.

Detection of inclination and shift will be explained as follows, referring to FIGS. 3 and 4.

Figure 3:
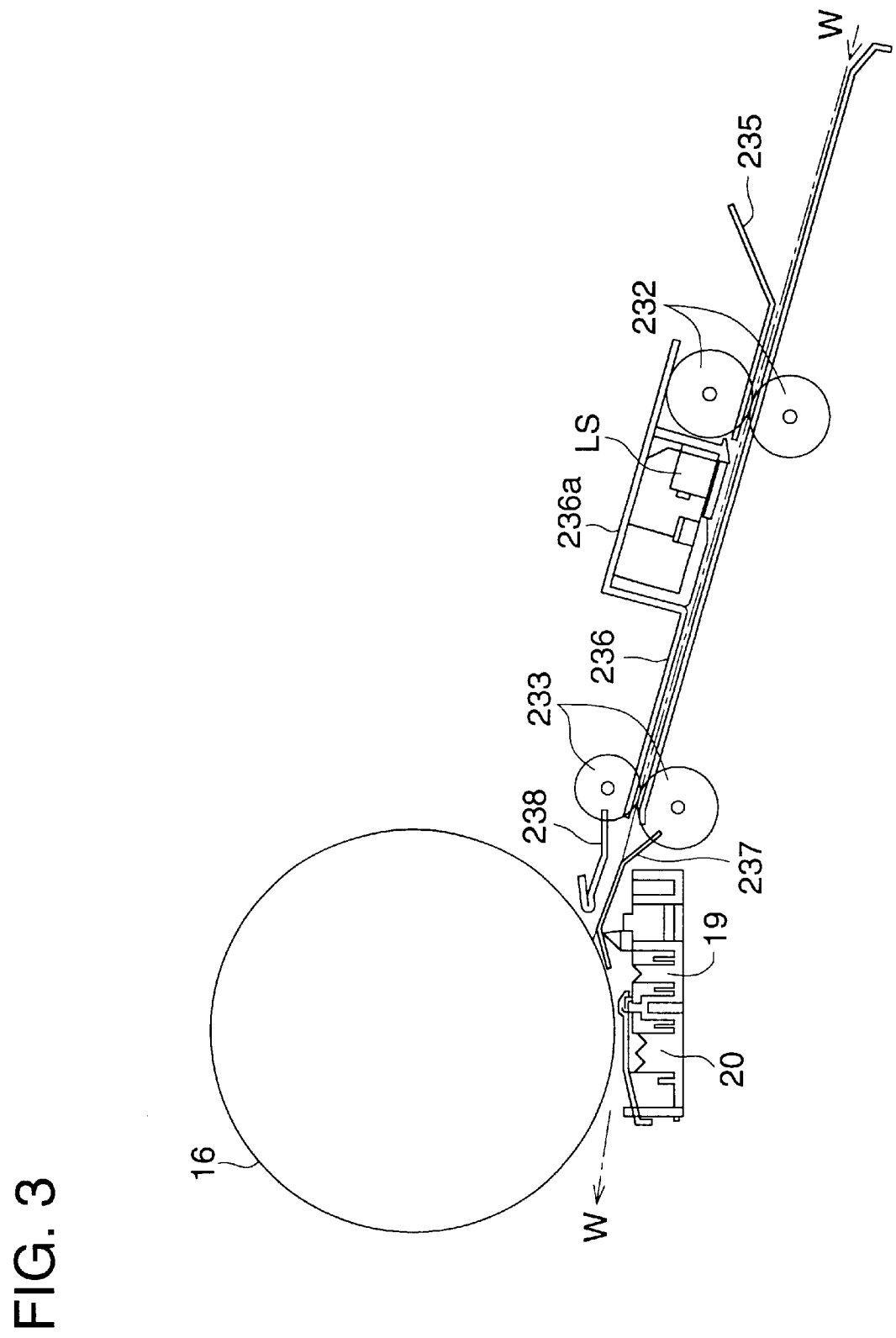
FIG. 3 is a sectional view of a recording sheet conveyance section positioned immediately upstream side of a transfer position in the image forming apparatus shown in FIG. 1.
Figure 4:
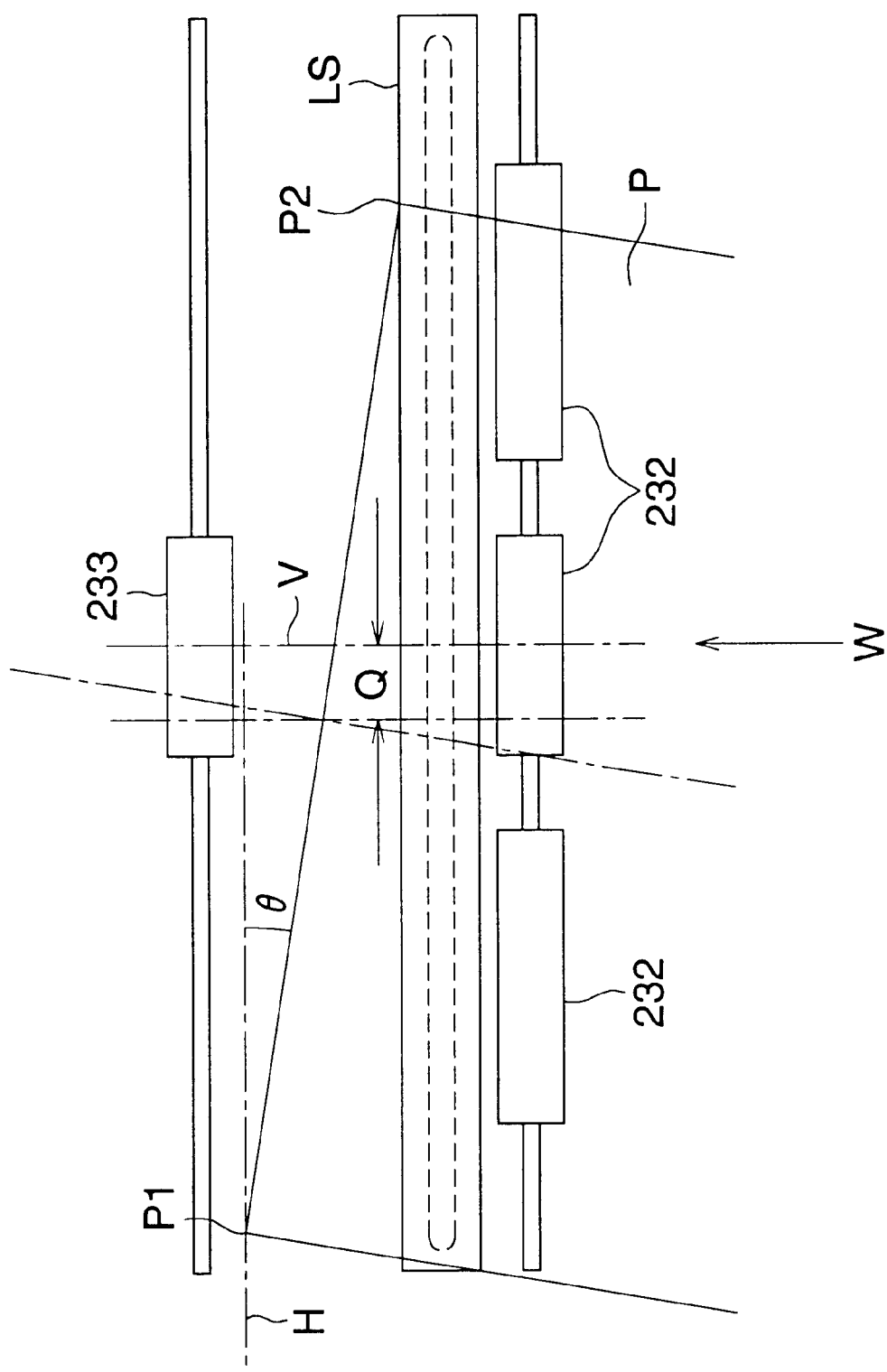
FIG. 4 is a top view of the recording sheet conveyance section shown in FIG. 3.
Figure 5:
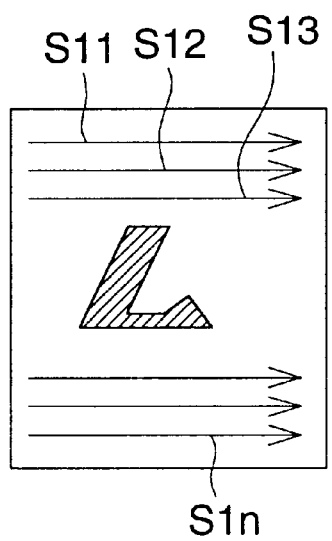
FIGS. 5(a)–5(d) are diagrams showing image forming steps in the image forming apparatus shown in FIG. 1.
Figure 5:
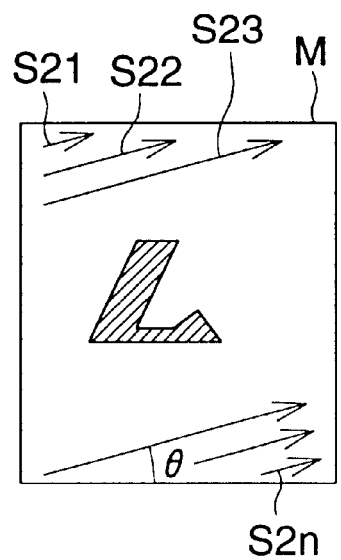
Figure 5:
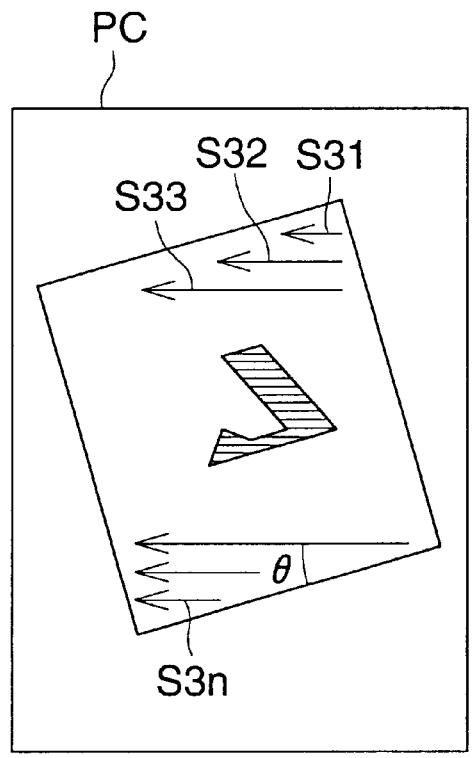
Figure 5:
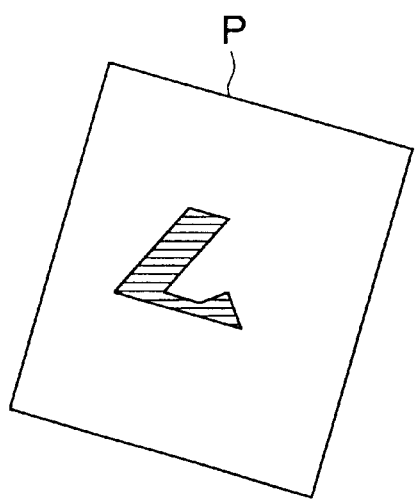

FIG. 3 is a sectional view of a conveyance section which conveys recording sheet P toward a transfer position formed by transfer electrode 19 in the image forming apparatus related to an embodiment of the invention, namely, toward an image forming position where an image is formed on a recording sheet, and FIG. 4 is a top view of the conveyance section.

On the upstream side of the transfer electrode 19, there are provided registration roller 232 and conveyance roller 233. Lower guide plate 234 is provided to be spread over the registration roller 232 and conveyance roller 233, while, upper guide plate 235 is provided on the upstream side of the registration roller 232, and upper guide plate 236 is provided between the registration roller 232 and the conveyance roller 233. The upper guide plate 235 has an inclined guide portion (having no symbol). Right on the downstream side of the registration roller 232, there is provided line sensor LS. The upper guide plate 236 has cover section 236a which covers the line sensor LS. Between the conveyance roller 233 and the transfer electrode 19, there are provided guide plates 237 and 238. Recording sheet P is conveyed as shown with an arrow mark, and when it passes through the transfer electrode 19, a toner image is transferred onto the recording sheet P from photoreceptor 16.

In the course of conveyance shown with an arrow mark for recording sheet P in the present embodiment, it is possible for the registration roller 232 and the conveyance roller 233 to rotate continuously without a temporary stop after they catch a leading edge of recording sheet P, and thereby to convey the recording sheet. Namely, it is possible to convey without forming a loop of recording sheet P on the upstream side of the registration roller 232. Further, it is also possible to employ a conveyance method wherein the registration roller 232 stops for a certain period of time after it receives recording sheet P, then, conveyance is started, and a loop of recording sheet P is formed on the upstream side of the registration roller 232, as in the past.

A leading edge of recording sheet P conveyed is detected by line sensor LS, and when recording sheet P having inclination angle θ and amount of shift Q is conveyed, transit time from the moment when preceding leading edge corner P1 of recording sheet P passes to the moment when succeeding leading edge corner P2 of recording sheet P passes, positions on lateral axis H for the preceding leading edge corner P1 and the succeeding leading edge corner P2, and inclination angle θ of the leading edge of recording sheet P can be obtained from information obtained through detection of line sensor LS. Incidentally, amount of shift Q is an amount of shift on axis H from the formal conveyance position at the leading edge portion of recording sheet P.

Next, image correction conducted by the use of the detected inclination angle θ and amount of shift Q will be explained as follows, referring to FIG. 5(a)–FIG. 7. Steps covering from document reading to image forming on recording sheet P are shown in FIGS. 5(a)–5(d).

Document G carrying thereon image "L" shown in FIG. 5(a) is subjected to scanning shown with s11–s1n by CCD line sensor 14b in FIG. 1, and image data are obtained. The image data are stored in image memory MR, and the state of image data stored in a storage area of memory MR can be indicated illustratively as M shown in FIG. 5(b). When reading an image from the storage area M, the reading is conducted in the direction which is inclined from the scanning line for reading by angle θ which is an inclination angle of recording sheet P, as shown in scanning lines s21–s2n.

Next, as shown in FIG. 5(c), scanning exposure is conducted on photoreceptor 16 in the direction of scanning lines shown with s31 and s32–s3n to form an image. This image is an image which is inclined corresponding to inclination for reading from memory M, as illustrated. Moreover, this image is a mirror image in which right and left are inverted. Lastly, an image on photoreceptor 16 is transferred onto recording sheet P, then, an image inclined by angle θ is formed on recording sheet P which is conveyed to be inclined by angle θ as shown in FIG. 5(d), and thereby, an image is formed on recording sheet P at a right angle.

When line sensor LS composed of CCD is used as a sensor which detects the leading edge of recording sheet P, inclination angle θ of the leading edge and shift Q in the direction perpendicular to the conveyance direction both shown in FIG. 4 in addition to the time required for leading edge corner P1 of recording sheet P which has inclination and shift and is conveyed are detected by line sensor LS and calculation section SO, as stated above. Therefore, the position to start scanning for exposure on photoreceptor 16 can be determined by the use of information obtained from line sensor LS and calculation section SO as will be explained as follows.

Figure 6:
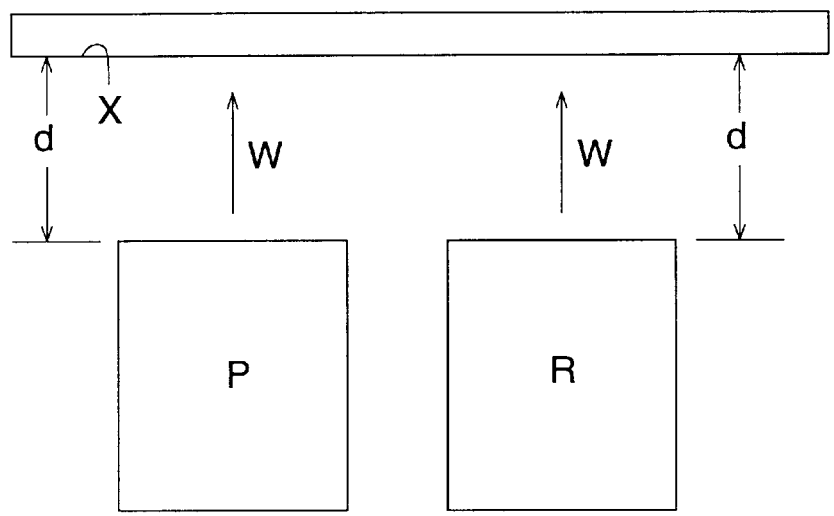
FIG. 6 is a diagram illustrating timing and position for image forming on the recording sheet conveyed without skewing and shift.

FIG. 6 is a diagram illustrating relationship between timing for conducting scanning exposure on photoreceptor 16 and image writing and timing for conveying a recording sheet. When a leading edge of recording sheet P is detected by line sensor LS this side of transfer position X, scanning exposure is started based on the detection signals so that a leading edge of image R may be formed to be away from transfer position X by distance d which is the same as that for recording sheet P, thus, an image is formed on photoreceptor 16 so that the leading edge of recording sheet P and that of image R may be aligned on the transfer position X.

Figure 7:
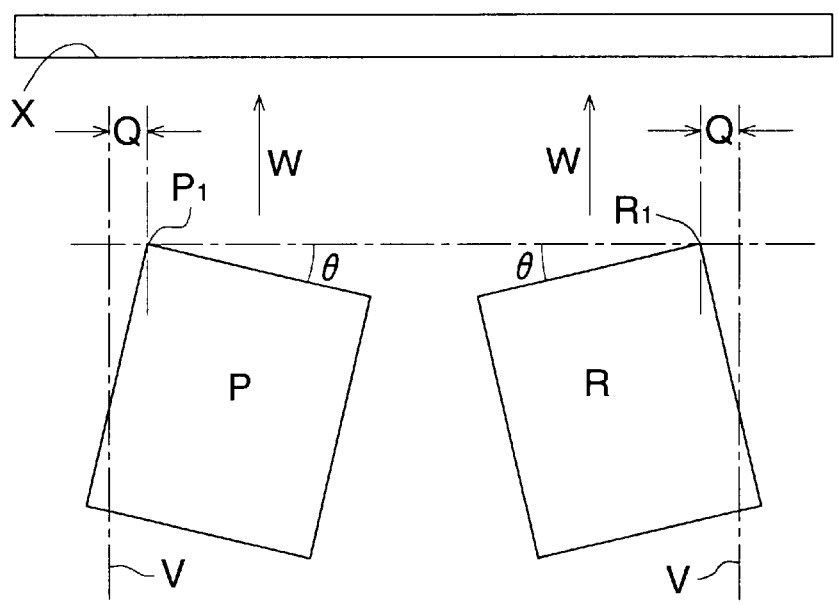
FIG. 7 is a diagram illustrating timing and position for image forming on the recording sheet conveyed with skewing and shift.

FIG. 7 shows relationship between recording sheet P conveyed to transfer position X while having inclination angle θ and shift Q and an image recording position.

When recording sheet P is inclined, leading edge corner P1 in the leading edge portion of recording sheet P is a basis for timing to start exposure. Namely, the timing to start scanning exposure is established so that the time required for leading edge corner P1 of recording sheet P to reach transfer position X may agree with that required for leading edge corner R1 of image R to reach transfer position X.

When the leading edge corner P1 is shifted from the formal position by amount Q, exposure is started from the position which is shifted by Q on horizontal axis H corresponding to the shift of recording sheet P.

With regard to timing for exposure scanning, namely to positioning on axis V in the longitudinal direction, when exposure scanning is started by applying a period of time from the detection of the leading edge by line sensor LS to the start of exposure, the period of time being set for the occasion wherein recording sheet P is conveyed normally while having neither inclination nor shift to a period of time from detection of leading edge corner P1 of recording sheet P conveyed while having inclination and shift to the start of exposure, an image can be formed on recording sheet P at the right position having no shift on axis V in the longitudinal direction.

As a constituent element of an inclination detection means, it is also possible to use two sensors arranged in the lateral direction of a recording sheet conveyance path, in place of line sensor LS, for detecting transit time and inclination of recording sheet P. With regard to an inclination angle of recording sheet P in this case, it can be obtained in the same way as in CCD line sensor LS. For synchronization between conveyance of a recording sheet and image forming, the time required for leading edge corner P1 of a recording sheet to reach transfer position X needs to be obtained, and this period of time can be obtained from the time which is required for the leading edge of a recording sheet to pass and is detected by the two sensors, the inclination angle, and size information of the recording sheet.

It is further possible to use the line sensor in combination with two sensors, and thereby to obtain an amount of shift by means of the line sensor and inclination and timing by means of the two sensors.

In the image forming apparatus of the present example, a leading edge portion of each recording sheet which passes through line sensor LS is detected, thereby, an inclination angle and an amount of shift of the recording sheet are calculated, and reading section RD is controlled for each recording sheet based on the result of the calculation. However, it is also possible to calculate an inclination angle and an amount of shift for the prescribed number of sheets such as, for example, a unit of 10 sheets, and to control reading section RD for the prescribed number of sheets based on the result of the calculation.

Further, the following example can be considered as another example having the structure which can correct a tendency toward inclination of a recording sheet which is specific to an apparatus, though it can not correct inclination of each recording sheet which takes place unexpectedly. That is, an image forming apparatus is not provided, instead, with line sensor LS and calculation section SO, but is provided with a recording material inclination memory which stores information of an inclination angle of a recording sheet. A serviceman observes a recorded image outputted from the image forming apparatus to judge, from inclination of that recorded image, an inclination of a recording sheet which is caused before the recording sheet arrives at a transfer electrode. Then, the serviceman inputs information concerning the inclination into the recording material inclination memory through a ten-key provided on an operation panel of the image forming apparatus. When forming an image, control section CR controls reading section RD based on information of the inclination of a recording sheet recorded in the recording material inclination memory. Due to this, an image processed properly is recorded on a recording sheet against the tendency toward inclination of a recording sheet which is specific to the apparatus.

Incidentally, in all cases of the examples stated above, there has been explained a copying machine of an electrostatic recording system. However, the invention is not limited to this, and a printer and an image forming apparatus of an ink jet system, for example, are also included in the invention.

It is also possible to arrange a mechanism which conducts not only image correction for an inclination of a recording sheet but also image correction wherein an inclination of a document is detected and the inclination of a document and an inclination of a recording sheet are considered. An inclination of a document can be detected by CCD line sensor 14 provided on image reading means A, for example, in the same way as in the case of inclination of a recording sheet. Then, an inclination angle and an amount of shift of a document are calculated by a calculation section based on the result of the detection conducted by CCD line sensor 14, and the values obtained through the calculation are stored momentarily in a memory. After that, values of an inclination angle and an amount of shift of a recording sheet are obtained through the aforesaid method. Then, the calculation section computes total values for inclination angles and amounts of shift by giving consideration to the values of an inclination angle and an amount of shift of a recording sheet and the values of an inclination angle and an amount of shift of a document which are stored in the memory and by adjusting them. When control section CR controls memory reading section RD based on the total values stated above, there is outputted an image wherein inclination angles and shift amounts for both a document and a recording sheet are corrected.

Even when a recording sheet is inclined to be conveyed to an image recording position where an image is formed on a recording sheet, image forming is conducted on the recording sheet with inclination corrected. Therefore, it is possible to form on the recording sheet an image which is free from inclination, and there is lightened a load for maintaining accuracy and strength imposed on design and manufacture of an inclination prevention mechanism which is for conveying a recording sheet to the image recording position without inclination. Thus, a degree of freedom for design of an image forming apparatus is increased, thereby, cost of an image forming apparatus can be reduced and a speed of an image forming apparatus can be increased.

What is claimed is:

1. An image forming apparatus comprising:

an image memory for storing data;

an image recording device having an image recording position for recording an image onto a recording material;

a conveying device for conveying the recording material to the image recording position;

an image correction device for correcting an angle of image data in accordance with an inclination of the recording material conveyed to the image recording position; and a recording material inclination memory which stores inclination information of the recording material in the conveying device, wherein the image correction device corrects the angle of the image data on the basis of the inclination information stored in the recording material inclination memory;

wherein an image is recorded on the recording material by the image recording device on the basis of the image data corrected by the image correction device; and wherein the image forming apparatus does not include a detector for detecting the inclination of the recording material.

2. The image forming apparatus of claim 1 further comprising a detecting member provided upstream of the image recording position in a conveyance direction of the recording material for detecting the inclination of the recording material.

3. The image forming apparatus of claim 1, wherein the image recording device comprises a photoreceptor and an exposure device for exposing the photoreceptor to form a latent image thereon, and wherein the exposure device forms the latent image on the photoreceptor on the basis of the image data corrected by the image correction device.

4. The image forming apparatus of claim 1, wherein the conveying device comprises a synchronization conveyance device for operating in synchronization with image forming of the image recording section and for conveying the recording material to the image recording position, and wherein after receiving a leading edge of the recording material, the synchronization conveyance device continues to operate without temporarily stopping the recording material.

5. An image forming apparatus comprising:

an image memory for storing data;

an image recording device having an image recording position for recording an image onto a recording material;

a conveying device for conveying the recording material to the image recording position; and an image correction device for correcting an angle of image data in accordance with an inclination of the recording material conveyed to the image recording position;

wherein an image is recorded on the recording material by the image recording device on the basis of the image data corrected by the image correction device; and wherein the conveying device comprises a synchronization conveyance device for operating in synchronization with image forming of the image recording section and for conveying the recording material to the image recording position, and wherein after receiving a leading edge of the recording material and stopping the recording material for a predetermined period of time, the synchronization conveyance device operates so as to restart a conveyance of the recording material.

6. The image forming apparatus of claim 5, further comprising a recording material inclination memory which stores inclination information of the recording material in the conveying device, wherein the image correction device connects the angle of the image data on the basis of the inclination information stored in the recording material inclination memory.

7. The image forming apparatus of claim 5, wherein the image recording device comprises a photoreceptor and an exposure device for exposing the photoreceptor to form a latent image thereon, and wherein the exposure device forms the latent image on the photoreceptor on the basis of the image data corrected by the image correction device.

* * * * *